3,039,404
MACHINES FOR MOULDING TABLETS FROM A ROPE OF SUGAR OR LIKE PLASTIC MATERIAL
Peter William Gilbey Johnston, Newcastle-on-Tyne, Northumberland, and Arthur Hudson, South Shields, England, assignors to Baker Perkins Limited, Peterborough, England, a British company
Filed Sept. 13, 1960, Ser. No. 55,619
Claims priority, application Great Britain Sept. 21, 1959
2 Claims. (Cl. 107—8)

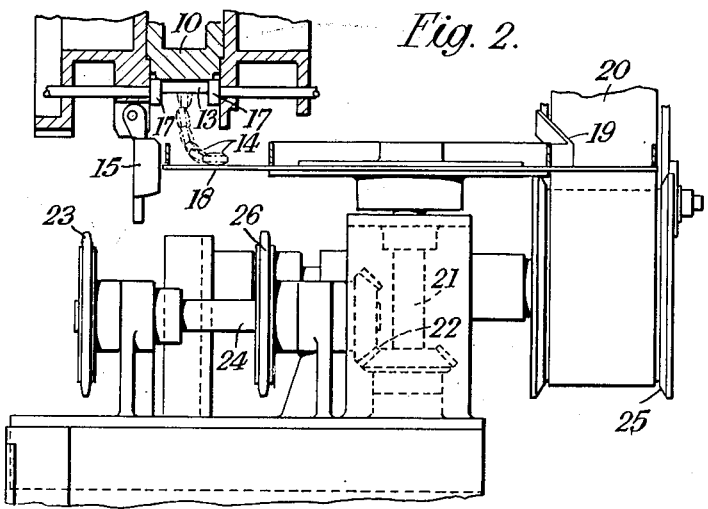
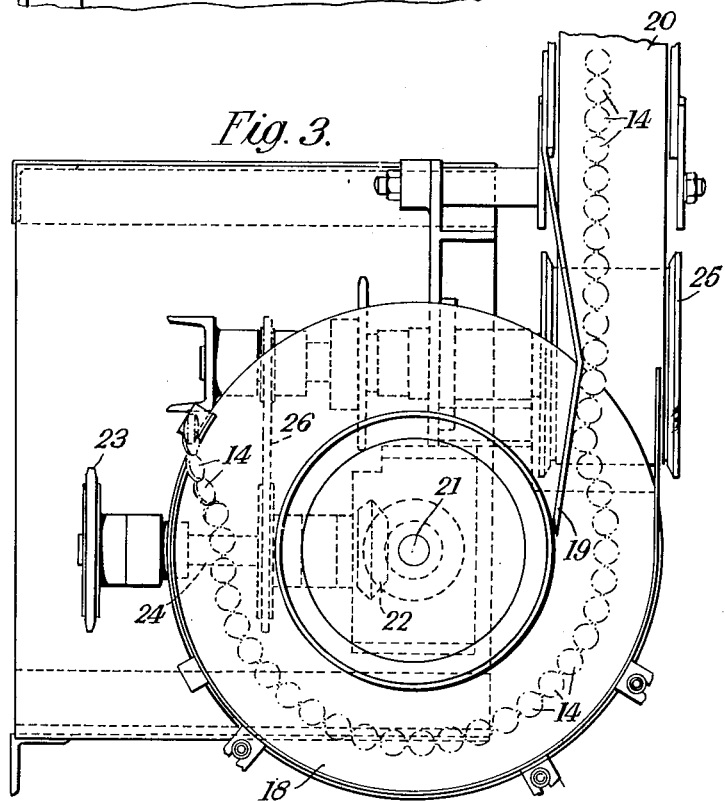

This invention relates to a machine for moulding tablets from a rope of sugar or like plastic material, the machine being of the type comprising a moulding wheel rotatable about a horizontal axis and formed with peripheral die cavities, means for feeding the rope to the moulding wheel and moulding members which co-operate with the moulding cavities to form from the rope a succession of moulded tablets. The machine may be either one which produces moulded tablets in the form of a chain of tablets interconnected by thin webs of stock, which are subsequently separated, or one which produces separate tablets at the moulding wheel.

It will be apparent that the speed of operation of such a machine is determined by the minimum time which can be allowed for the moulding of the tablets. In order to be able to increase the speed of production without reducing the moulding time below the minimum, the arc over which the moulded tablets are carried by the wheel should be arranged to be as large as possible.

Various proposals have been made for increasing the length of the moulding arc. For example, in one arrangement which has been proposed, a rope of material to be moulded is fed along a horizontal path to the wheel at a point near the top of the wheel, the moulded material is carried over by the wheel and the moulded tablets in chain form leave the wheel travelling in a substantially vertically downward direction and are then guided on to a conveyor which carries them away in the same horizontal direction in which the rope is fed to the wheel. This arrangement has the advantage that the rope of material and the moulded tablets follow the same flow line, but the arc traversed during the moulding operations is still less than half the circumference of the wheel.

In another arrangement which has been proposed, the rope of material to be moulded is fed along a horizontal path to the wheel at a point near the top thereof, the material during moulding is carried over the wheel and the moulded tablets leave the wheel at the lowermost point thereof and are carried away by a conveyor in the opposite direction to that in which the rope is fed to the wheel. This arrangement has the advantage that a substantial moulding arc is obtained, but the disadvantage that the flow line for the material is reversed.

In yet another arrangement which has been proposed, the rope of material to be moulded is fed along a horizontal path, is turned through 180° in a horizontal plane, is directed on to the moulding wheel at a point near the top thereof, is carried over the wheel in the moulding operation, and the moulded tablets leave the wheel at the lowermost point and are carried away on a conveyor in the same direction as the initial flow line of the rope prior to its being turned through 180°. Such an arrangement has the advantage of providing a large arc within which the moulding operation is effected, but has the disadvantage that the rope to be moulded is subjected to considerable stresses when being turned round through 180° prior to feeding to the moulding wheel. Such turning is known to induce cracking, which can be particularly undesirable with a material consisting of jam-centred rope of sugar.

It is an object of the present invention to provide a machine of the type specified, which has the advantage that the moulding operation can be effected over a large arc of the moulding wheel, but which does not suffer from the disadvantages of the aforementioned arrangements.

The invention provides a moulding machine of the type specified in which the tablets are discharged from the moulding wheel near the lowermost point thereof and which includes a rotary turntable situated beneath the moulding wheel which receives the discharged tablets, and means for rotating the turntable so that its upper surface travels in the same sense as the lowermost portion of the moulding wheel, the turntable transporting the tablets in a circular path and discharging the tablets in a predetermined flow line.

Preferably the peripheral speed of the portion of the turntable receiving the tablets is the same as that of the moulding wheel. Preferably also the machine includes a conveyor for receiving the tablets discharged from the turntable and extending away from the moulding wheel at the sides thereof remote from the entering rope.

One embodiment of moulding machine according to the invention will now be described in more detail, by way of example, with reference to the accompanying diagrammatic drawings, in which:

FIG. 2 is a view looking from the left hand side of FIG. 1, and

FIG. 3 is a plan view of the turntable and band conveyor.

Figure 1:
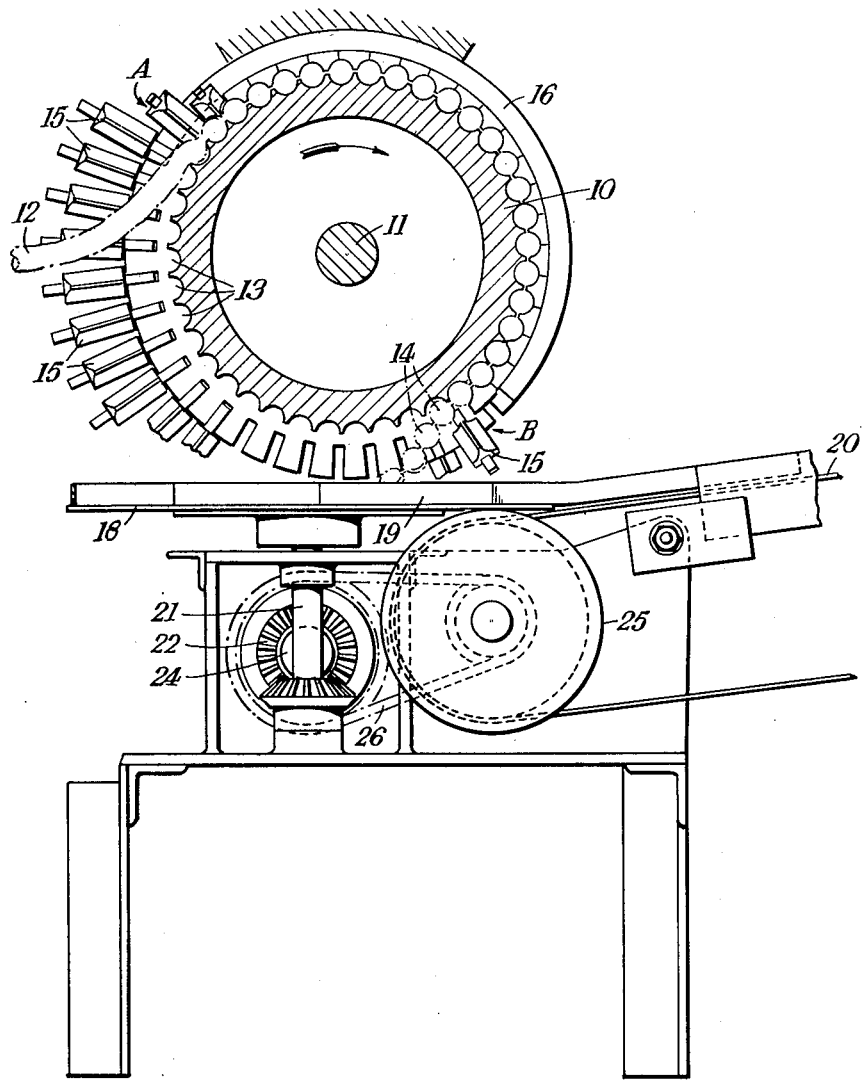
FIG. 1 is a front elevation of the machine, partly in section.

The machine includes a moulding wheel 10 mounted on a horizontal shaft 11 which is continuously rotated by a motor (not shown). The rope 12 of sugar to be moulded is fed to the wheel 10 to a point A on its periphery somewhat below its top. The wheel 10 is provided with die cavities 13 and moulding members are provided which cooperate with the die cavities to form the rope 12 into a chain of tablets 14 interconnected by thin webs of stock. These moulding members are of known construction and consist of pivoted flaps 15, which are moved inwardly to mould the tablets by a fixed cam 16 and thereafter fall away under the action of gravity to permit of discharge of the tablets from the wheel, and end plungers 17 (FIG. 3) which are moved in and out by further fixed cams (not shown). The tablets 14 so moulded are carried over by the wheel 10 to a delivery point B near the lowermost point of the wheel. At this point the tablets leave the wheel 10 and are fed on to the upper surface of a horizontally disposed rotating turntable 18. The portion of the upper surface of the turntable 18 on to which the chain of tablets is discharged moves in the same sense as and at the same peripheral speed as the lowermost portion of the moulding wheel 10.

The moulded tablets 14 carried forward by the turntable travel in a circular path, and when they have reached a point C where they have turned through 180° on the turntable, they are engaged and guided by a plough guide 19 which diverts them on to a conveyor band 20 which carries them to a cooler, wrapping machine or other destination. The conveyor band 20 extends away from the moulding wheel 10 at the side thereof remote from the entering rope 12.

The shaft 21 carrying the turntable 18 is driven by bevel gearing 22 from a shaft 24 driven by a sprocket wheel 23. The shaft 24 drives a pulley 25 which drives the conveyor band 20 through a belt drive 26.

The speed of the machine illustrated may be high, since the moulding operation is effected over a large arc of the moulding wheel, the rope of material being fed to the wheel at A just before the uppermost point of the wheel is reached and the tablets being discharged at B near the lowermost point. The turntable 18 not only permits of discharge of the tablets from the moulding wheel at a point near the bottom thereof, but also delivery of the tablets to a conveyor which takes the tablets away in the same direction as the direction of travel of the entering rope 12.

It will be appreciated that the tablets produced by the moulding wheel may be separate tablets or, as shown, a chain of tablets interconnected by thin webs of stock. In the latter case, there is the added advantage of the arrangement according to the present invention that the chain of tablets is fed tangentially from the discharge point B of the moulding wheel directly on to the turntable 18. This eliminates any sag in the chain of tablets and any damage resulting from such sag.

What we claim as our invention and desire to secure by Letters Patent is:

1. A machine for moulding tablets from a rope of sugar or like plastic material comprising a moulding wheel rotatable about a horizontal axis and formed with peripheral die cavities, moulding members pivoted to the moulding wheel which cooperate with said die cavities to form from the rope a succession of moulded tablets, said moulding members moving inwardly to engage said rope at one side of the moulding wheel at a point below the top of the moulding wheel and moving outwardly to release said tablets on the other side of the moulding wheel at a point closely adjacent the lowest point of the moulding wheel, a horizontal turntable positioned beneath said moulding wheel to receive said tablets from the moulding wheel, means for rotating said turntable so that its upper surface travels in the same direction as and at substantially the same peripheral speed as the lowest portion of said moulding wheel, and a conveyor for receiving tablets discharged from the turntable and positioned to carry them away from the moulding wheel at the side thereof remote from the entering rope.

2. A machine according to claim 1, in which the conveyor is a band conveyor and which includes a plough guide for diverting the tablets on the turntable on to the band.

References Cited in the file of this patent
UNITED STATES PATENTS

| | | |
|---|---|---|
| 1,118,425 | Johnson | Nov. 24, 1914 |
| 1,967,565 | Thurlings | July 24, 1934 |
| 2,157,467 | Thurlings | May 9, 1939 |
| 2,164,285 | Schutz | June 27, 1939 |
| 2,338,348 | Newman | Jan. 4, 1944 |
| 2,871,984 | Colman | Feb. 3, 1959 |